United States Patent
Tokuda et al.

(10) Patent No.: US 7,586,563 B2
(45) Date of Patent: Sep. 8, 2009

(54) COLOR FILTER SUBSTRATE AND LIQUID CRYSTAL DISPLAY DEVICE

(75) Inventors: Tsuyoshi Tokuda, Tsu (JP); Toshifumi Yagi, Tsu (JP); Toshihide Tsubata, Tsu (JP); Yoshinori Kinai, Matsusaka (JP); Ryuji Kurihara, Taki-gun Mie (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 436 days.

(21) Appl. No.: 11/183,734

(22) Filed: Jul. 19, 2005

(65) Prior Publication Data

US 2006/0017872 A1    Jan. 26, 2006

(30) Foreign Application Priority Data

Jul. 21, 2004   (JP) ............................. 2004-213482

(51) Int. Cl.
*G02F 1/1335*   (2006.01)
(52) U.S. Cl. ...................................... 349/106
(58) Field of Classification Search .......... 349/106–107
See application file for complete search history.

(56) References Cited

U.S. PATENT DOCUMENTS

| 4,470,667 | A |   | 9/1984 | Okubo et al. |
| 4,761,058 | A |   | 8/1988 | Okubo et al. |
| 5,101,289 | A | * | 3/1992 | Takao et al. ................... 349/106 |
| 5,194,976 | A | * | 3/1993 | Nakano et al. ............... 349/138 |
| 5,398,126 | A | * | 3/1995 | Takao et al. ................... 349/106 |
| 5,500,751 | A | * | 3/1996 | Takao et al. ................... 349/106 |
| RE35,275  | E |   | 6/1996 | Okubo et al. |
| 5,734,456 | A | * | 3/1998 | Takao et al. ................... 349/106 |
| RE36,161  | E |   | 3/1999 | Okubo et al. |
| 6,025,899 | A | * | 2/2000 | Fukunaga et al. ........... 349/115 |

FOREIGN PATENT DOCUMENTS

| JP | 56-140324 A | 11/1981 |
| JP | 04-093924 A | 3/1992 |
| JP | 05-196946 A | 8/1993 |
| JP | 6-324210 | 11/1994 |
| JP | 11-248921 | 9/1999 |
| JP | 2000-147234 A | 5/2000 |
| JP | 2000-284111 A | 10/2000 |
| JP | 2001-100221 A | 4/2001 |
| JP | 2001-221910 A | 8/2001 |
| JP | 2004-53654 A | 2/2004 |

* cited by examiner

*Primary Examiner*—James A Dudek
(74) *Attorney, Agent, or Firm*—Birch, Stewart, Kolasch & Birch, LLP

(57) ABSTRACT

The present invention is a color filter substrate comprising: a non-laminated part in which a colored layer and/or a transparent layer are arranged in a plane; and a laminated part in which parts of the colored layer and/or the transparent layer are laminated as two or more layers on a substrate, (1) a film thickness of a layer constituting the laminated part is not less than 90% and not more than 110% to a film thickness of a corresponding layer of the non-laminated part and/or (2) the colored layer and/or the transparent layer are formed using a dry film having a solid-phase resist layer having penetration amount in a penetration hardness test at 120° C. of not more than 0.5 μm.

5 Claims, 6 Drawing Sheets

COLOR FILTER SUBSTRATE AND LIQUID CRYSTAL DISPLAY DEVICE

REFERENCE TO RELATED APPLICATION

This Nonprovisional application claims priority under 35 U.S.C. §119(a) on Patent Application No. 2004-213482 filed in Japan on Jul. 21, 2004, the entire contents of which are hereby incorporated by reference.

BACKGROUND OF THE INVENTION

1. Field of the Invention

The present invention relates to a color filter substrate preferably used in a liquid crystal display device, its manufacturing method, and a liquid crystal display device. More specifically, it relates to a color filter substrate having a laminated part which is laminated by a dry film laminating method and suitable for a spacer which specifies a thickness (cell gap) of a liquid crystal layer of a liquid crystal display device, its manufacturing method and a liquid crystal display device using that color filter substrate.

2. Description of the Related Art

Since the liquid crystal display device has merits, that is, it is small, thin, and light and its power consumption is low, it is widely used in various kinds of electronic devices. Especially, a liquid crystal display device which implements a color display by using a color filter (referred to as the "CF" hereinafter occasionally) substrate has excellent color reproducibility, so that it can be widely applied to an office automation (OA) device such as a personal computer, an audio visual (AV) device such as a television, a mobile phone and the like.

The liquid crystal display device has a structure in which a liquid crystal is sealed between a pair of substrates opposed to each other, and conventionally a thickness (cell gap) of the liquid crystal layer is retained constant by sphere or rod-shaped spacer (dispersed spacer) made of plastic beads or glass fiber which is dispersed on the substrate in many cases. However, it is difficult to arrange the dispersed spacer in a predetermined position on the substrate, and scattering of light caused by the spacer in the pixel (display area) or an alignment disturbance of a liquid crystal molecule in the vicinity of the spacer is generated, which causes the display quality to be lowered. In addition, there is room for improvement with respect to the following point. When the substrate to which the spacer is dispersed is pressed against the opposed substrate to be bonded, an opposed electrode or an alignment film is damaged by the dispersed spacer, so that the display defect is easily generated, and a contaminating material comes out of a damaged part, so that the display quality is easily lowered. In addition, it is necessary to provide a step of uniformly disperse the spacer on the substrate, and a step of maintaining grain size distribution at the time of dispersion with high precision, and it is difficult to provide a stable display quality.

Meanwhile, instead of the dispersed spacer, a method in which a resin film integrally formed with the substrate is used as a spacer for adjusting the cell gap comes into use, and especially, a method in which a photo spacer (referred to as the "PS" hereinafter occasionally) formed by patterning a photo resist film comes into use recently (refer to Japanese Unexamined Patent Publication No. 2001-221910 (P.1 and 7, FIG. 2), Japanese Unexamined Patent Publication No. Sho56-140324 (P. 1 and 6, FIG. 5(c)), Japanese Unexamined Patent Publication No. Hei4-93924 (P.1 and 6, FIGS. 2 and 3), Japanese Unexamined Patent Publication No. Hei5-196946 (P.1 and 3, FIG. 1), Japanese Unexamined Patent Publication No. 2000-147234 (P.1), Japanese Unexamined Patent Publication No. 2001-100221 (P.1, 13, and 16, FIGS. 1 and 6), Japanese Unexamined Patent Publication No. 2000-284111 (P.1 and 8, FIG. 1(b)) and Japanese Unexamined Patent Publication No. 2004-53654 (P. 2 and 30, FIG. 11(b)). Since the PS can be correctly arranged in a predetermined position on the substrate unlike the dispersed spacer, when the PS is arranged on a non-display area such as on a black matrix (referred to as the "BM" hereinafter occasionally) of the CF substrate or on a metal wiring of a thin film transistor (referred to as the "TFT" hereinafter occasionally) array substrate, the cell gap can be retained constant without lowering an aperture ratio. In addition, SP has a merit in which the display quality is not lowered due to the scattering of the light or the alignment disturbance of the liquid crystal molecule in the vicinity of the spacer like the dispersed spacer.

According to the Japanese Unexamined Patent Publication No. Sho56-140324, Japanese Unexamined Patent Publication No. Hei4-93924, Japanese Unexamined Patent Publication No. Hei5-196946, Japanese Unexamined Patent Publication No. 2000-147234, Japanese Unexamined Patent Publication No. 2001-100221, Japanese Unexamined Patent Publication No. 2000-284111 and Japanese Unexamined Patent Publication No. 2004-53654, a method in which a cell gap adjusting spacer comprising a plurality of laminated colored layers is used is proposed. The colored layer is formed of a photoresist in general, and the photo spacer having the laminated structure is referred to as a laminated photo spacer (laminated PS) in general. Since the laminated PS comprises the plurality of laminated colored layers, the spacer itself has light shielding property, so that even when it is arranged in the display area, the display quality is not lowered because of light leakage. In addition, when all of the layers constituting the laminated PS are formed of the same material as that used in the colored layer of the pixel region, its cost can be considerably lowered.

In addition, according to Japanese Unexamined Patent Publication No. 2001-100221, Japanese Unexamined Patent Publication No. 2000-284111 and Japanese Unexamined Patent Publication No. 2004-53654, as a method of forming the laminated PS, a dry film laminating (referred to as the "DFL" hereinafter occasionally) is proposed. According to the DFL method, a film (dry film) having a resin film provided on a supporting body is bonded to form the layer. When a resist resin film is used as the resin film, it is called a dry film resist (referred to as "DFR" hereinafter occasionally) method. According to the DFL method, a layer having a more uniform film thickness can be formed and the laminated PS having a more stable height can be formed as compared with a coating method using a liquid resist such as a spin coat method.

However, there is room for improvement in the case where the laminated PS is manufactured by the DFL method, when the dry film is bonded (laminated), air existing between the patterns formed already cannot escape and remains as a bubble, which causes the display defect in the liquid crystal display device. A degree of generation of the bubble is varied depending on a film thickness of the pattern (resist layer) formed already. Recently, since a color purity of the liquid crystal display device such as a liquid crystal television (TV) becomes increasingly high and a colored resist layer which constitutes the color filter layer becomes as thick as 1.5 to 2.5 μm, the air is more likely to be remained between the patterns at the time of laminating in the course of forming the laminated PS, so that the bubble is likely to be generated.

SUMMARY OF THE INVENTION

The present invention was made in view of the above-mentioned state of the art and it is an object of the present invention to provide a color filter substrate in which a variation in height can be reduced and a bubble is prevented from being generated when a laminated photo spacer is formed, and its manufacturing method, and a liquid crystal display device in which display unevenness is prevented by using that-color filter substrate.

While the inventors of the present invention made many studies about the color filter (CF) substrate comprising the laminated photo spacer (PS), it was found that the laminated PS having a uniform film thickness could be formed by forming each layer (pattern) of the laminated PS by using the dry film laminating (DFL) method. However, it was also found that when the laminated PS was manufactured by the DFL method, the bubble was likely to be contained between the patterns when the dry film was laminated. Thus, according to further studies, it was found that when the laminated PS of the CF substrate was manufactured by the DFL method, in order to form the CF substrate without containing the bubble between the patterns, it was necessary to set a substrate temperature at the time of laminating in a pattern forming region at 110° C. or more. Since it is difficult to make the temperature in the substrate completely uniform actually, it was found that it was necessary to set an average temperature at 120° C. or more. Here, the inventors of the present invention manufactured a liquid crystal display device using a CF substrate having a laminated PS which was manufactured by laminating the conventional dry film, at a lower limit temperature at which the bubble is not generated, that is, at the average substrate temperature 120° C. but it was found that considerable display unevenness was generated. Then, the position where the display unevenness was generated was examined and it was confirmed that the thickness of the liquid crystal layer was varied at the position of the unevenness, and a variation in height of 0.05 to 0.10 µm was generated in each laminated PS provided in the position of the variation in thickness of the liquid crystal layer. In addition, although each layer was formed by the DFL method, the laminated PS was much thinner than a target film thickness (height) calculated from a total of each film thickness, and the thinnest layer had a thickness of only about 75% of the film thickness of the corresponding layer in the pixel.

These phenomena were not known and in the Japanese Unexamined Patent Publication No. 2001-100221, and Japanese Unexamined Patent Publication No. 2004-53654, the bonding temperature of the dry film was not disclosed and the above-described phenomena were not described. In addition, although it was described that the substrate temperature was heated up to about 100° C. to laminate the dry film in the embodiment 1 in the Japanese Unexamined Patent Publication No. 2000-284111, when the CF substrate was manufactured actually, as described above, the bubble was generated at the time of laminating if the substrate temperature was under 110° C., so that the CF substrate having a defect in the pixel was provided.

As a result of further studies, the inventors of the present invention found that the variation in height or the decrease in thickness was generated in the laminated PS formed by the DFL method because the resin film (resist layer) of the dry film was softened by the high temperature at the time of bonding (laminating). Regarding this, a behavior of the resist layer when it is bonded at 120° C. or more at which the bubble can be prevented from being generated will be described with reference to FIG. 1. When the substrate temperature becomes high at the time of bonding, since the resist layer is softened and has a slight fluidity, so that a part of a resist layer 22p on a base layer 21p of the laminated PS is moved to a flat part 22 (moved in a direction shown arrows in the drawing) by pressure when the dry film is bonded. As a result, a film thickness of the resist layer 22p is reduced from the target height by Δh. Thus, the laminated PS having a desired height cannot be provided. In addition, since the amount Δh of height change of the resist layer 22p at this time is varied depending on the temperature, a pressure and the like in the substrate, the height of the laminated PS is varied, so that cell thickness becomes uneven in the liquid crystal display device and it becomes visible as display unevenness.

The inventors of the present invention made many studies in view of the above facts and found that when a thickness ratio of a colored layer and/or a transparent layer constituting the laminated PS (laminated part) (film thickness of a layer constituting a laminated part/film thickness of a corresponding layer of a non-laminated part) and film hardness at high temperature were made optimum, that is, (1) the film thickness of the layer constituting the laminated part was made to be not less than 90% but not more than 110% to the film thickness of the corresponding layer of the non-laminated layer, and (2) the colored layer and/or the transparent layer were formed using the dry film having the solid-phase resist layer whose penetration amount in a penetration hardness test at 120° C. was 0.5 µm or less, the laminated part having the desired height could be formed and the variation in height of the laminated part could be reduced, so that the display unevenness of the liquid crystal display device could be prevented. Thus, the inventors of the present invention could solve the above-described problems and reached the present invention.

That is, the present invention provides a color filter substrate comprising a non-laminated part in which a colored layer and/or a transparent layer are arranged in a plane, and a laminated part in which parts of the colored layer and/or the transparent layer are laminated as two or more layers on a substrate, wherein a film thickness of a layer constituting the laminated part is not less than 90% and not more than 110% to a film thickness of a corresponding layer of the non-laminated part.

In addition, the present invention provides a color filter substrate comprising a non-laminated part in which a colored layer and/or a transparent layer are arranged in a plane, and a laminated part in which parts of the colored layer and/or the transparent layer are laminated as two or more layers on a substrate, wherein the colored layer and/or the transparent layer are formed using a dry film having a solid-phase resist layer having penetration amount in a penetration hardness test at 120° C. of not more than 0.5 µm.

EXPLANATION OF REFERENCE NUMERALS

Figure 1:
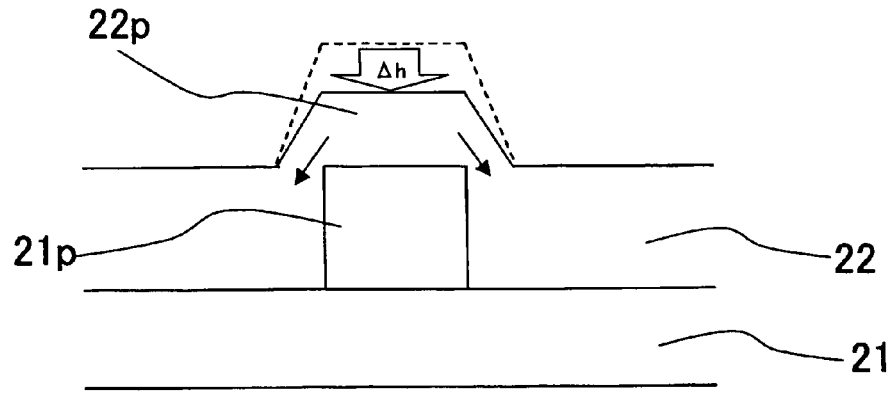
FIG. 1 is a schematic sectional view showing a behavior of a resist layer when a substrate temperature is about 120° C. or more, in a course of forming a laminated PS by a conventional dry film laminating method.

1: active matrix (AM) substrate
2: color filter (CF) substrate
3: liquid crystal
4, 21: transparent substrate
5: light-shielding layer (black matrix, colored layer constituting non-laminated part)
6: colored layer (non-laminated part)
7: first CF layer (colored layer constituting non-laminated part)
7p: first CF layer (colored layer constituting laminated part)
8: second CF layer (colored layer constituting non-laminated part)
9: third CF layer (colored layer constituting non-laminated part)
9p: third CF layer (colored layer constituting laminated part)
10: common electrode (transparent electrode)
10p: common electrode (formed in laminated PS)
11p: insulating resin film (transparent layer constituting non-laminated part)
12p: laminated PS (laminated part)
21: substrate
21p: base layer
22: flat part
22p: solid phase resist layer (on base layer 21p)
30: base film
31: thermoplastic resin layer
32: middle layer
33: solid phase resist layer
34: substrate
35: thermal probe
100: liquid crystal display device

DETAILED DESCRIPTION OF THE PREFERRED EMBODIMENTS

A color filter (CF) substrate according to the present invention comprises a non-laminated part in which a colored layer and/or a transparent layer are arranged in a plane, and a laminated part in which parts of the colored layer and/or the transparent layer are laminated as two or more layers on a substrate. The CF substrate according to the present invention may comprise another component or may not comprise another component as long as it comprises the above components, which is not limited in the present invention.

It is preferable that the colored layer and the transparent layer are formed by the dry film laminating (DFL) method and more specifically, for example, it is preferable that the dry film comprising a resin film (solid-phase resist layer) provided on a base film (supporting body) is bonded onto the substrate surface whose average temperature set at about 120° C., the base film is removed to transfer the resin film on the substrate, and the transferred resin film is exposed and developed to be patterned into a predetermined configuration so as to be formed on the substrate. As a base resin contained in the resin film of the dry film, it is preferably a photosensitive resin and especially it is preferably a photosensitive acrylic resin. As a coloring agent contained in the resin film for forming the colored layer, there is a pigment or a dye of red (R), blue (B), green (G), or black (K). The resin film may comprise a polyfunctional monomer, a photo polymerization initiator, a dispersant, an additive agent and the like or may not comprise them other than the base resin and the coloring agent. As the base film of the dry film, polyethylene terephthalate (PET) film or the like is used.

The configuration of the color filter substrate according to the present invention comprises either a configuration (1) the film thickness of the layer constituting the laminated part is not less than 90% but not more than 110% to the film thickness of the corresponding layer of the non-laminated part, or a configuration (2) the colored layer and/or the transparent layer are formed using the dry film having the solid-phase resist layer having penetration amount in the penetration hardness test at 120° C. of 0.5 µm or less, or combination of these configurations. In addition, the configuration (2) is one of preferable configurations in implementing the configuration (1). According to the configuration (1), since the thickness ratio of the layer constituting the laminated part (film thickness of the layer constituting the laminated part/film thickness of the corresponding layer of the non-laminated part) is not less than 90% but not more than 110%, the laminated part can have the desired height close to the target height calculated from the total of the film thickness of each layer constituting the laminated part. In addition, according to the layer having the thickness ratio which is not less than 90% but not more than 110%, since its film deformation amount itself is small and the variation in film thickness is sufficiently reduced, so that variation in height of the laminated part comprising such layers are also sufficiently reduced. In addition, according to the configuration (2), since the solid-phase resist layer is prevented from thermally sagging under the high temperature as shown in FIG. 1 in the course of forming the laminated part by the DFL method, the laminated part having the desired height can be provided. In addition, since the solid-phase resist layer having excellent hardness at high temperature is not likely to be influenced by the temperature or the pressure distributed on the substrate surface when the film is formed, the variation in film thickness can be sufficiently prevented and the variation in height of the laminated part comprising such layers can be sufficiently prevented. As a result, in the case the CF substrate according to the present invention is applied to the liquid crystal display device, using the laminated part as the spacer which defines the cell thickness, a desired cell thickness can be provided and the display unevenness caused by the variation in cell thickness can be prevented.

According to the configuration (1), the layer constituting the laminated part and the corresponding layer of the non-laminated part are formed of substantially the same material and preferably formed at the same step by the DFL method. The film thickness of the layer constituting the laminated part is preferably not less than 95% but not more than 110% to the film thickness of the corresponding layer of the non-laminated part. In addition, the bottom layer constituting the laminated part is generally about 100% to the filmthickness of the corresponding layer of the non-laminated part.

Figure 2:
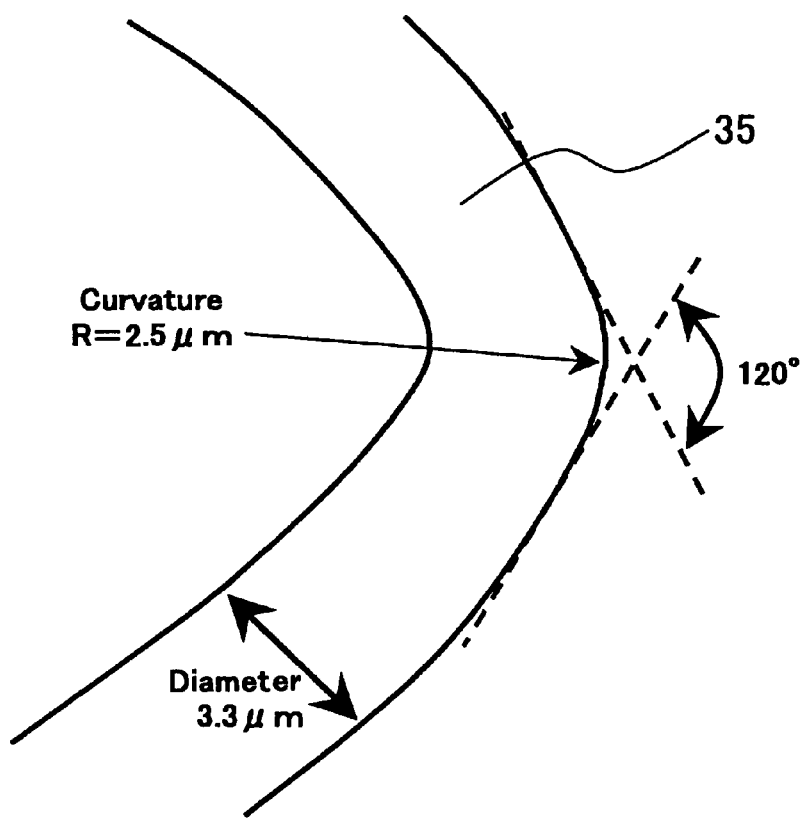
FIG. 2 is a schematic view showing a tip end configuration of a thermal probe used in a penetration hardness test.

The penetration hardness test according to the configuration (2) is a test to measure penetration characteristics of the film, that is, hardness characteristics of the film. More specifically, a thermal probe 35 provided by bending a platinum-rhodium resistor body having a diameter of 3.3 μm into a V shape so as to implement that a tip end angle is 120° and a tip end curvature R is 2.5 μm as shown in FIG. 2 is pressed against the film to be tested under load of $1.0 \times 10^{-5}$ N at a set temperature (120° C. in the present invention), and a distance of the thermal probe 35 in the film (penetration amount) is measured (reference document: "Micro Thermal Analysis of Polymer Material by SPM" by Shuji Kanayama, FUJIFILM RESEARCH & DEVELOPMENT, Fuji Photo Film Co., Ltd. 2002, No. 47, p. 44-45). In addition, the dry film means a film in which the solid-phase resist layer is provided on the base film (supporting body). As the base film (supporting body), there is a polyethylene terephthalate (PET) film or the like. The solid-phase resist layer may comprise one layer or has a multilayer structure. The film thickness of the solid-phase resist layer is preferably not less than 1.0 μm but not more than 3.0 μm. In addition, the dry film preferably comprises a thermoplastic resin layer to improve the bonding ability to the substrate and a middle layer to prevent mixture and adhesion between the thermoplastic resin layer and the solid-phase resist layer between the solid-phase resist layer and the base film.

According to the configuration (2), it is preferable that a difference between a maximum penetration amount and a minimum penetration amount in a penetration hardness test at 110 to 140° C. is not more than 1.0 μm in the solid-phase resist layer. According to the laminated part formed of such solid-phase resist layer, the desired height can be more surely provided and the variation in height can be further prevented. It is more preferable that the difference between the maximum penetration amount and the minimum penetration amount in the penetration hardness test at 110 to 140° C. is not more than 0.5 μm.

Each material constituting the present invention will be described hereinafter.

As the substrate, a transparent substrate such as a glass substrate is used in general. The colored layer is generally formed of a photosensitive resin in which a pigment of red, blue, green, black and the like is dispersed and a negative type photosensitive resin is preferably used for it. As the transparent layer, there is a layer formed of a resin constituting a projection for controlling a liquid crystal alignment, an overcoat layer (protection layer of the colored layer) and the like. According to the non-laminated part, the colored layers of red (R), blue (B), green (G), black (K) and the like and/or the transparent layer are arranged in a plane and when light transmit the colored layer and/or the transparent layer, the color display is implemented. As the non-laminated part, a configuration that the three colored layers of R, B and G are arranged in a plane is preferable and it is more preferable a colored layer of K is further contained in the above configuration. Although a dimension and a shape and the like of the colored layer and the transparent layer constituting the non-laminated part are not particularly limited, it is preferably that each layer has almost the same film thickness in view of maintaining the display quality. The pattern arrangement of the colored layer and/or the transparent layer in the non-laminated part is not particularly limited, and there are a delta arrangement, a mosaic arrangement, a stripe arrangement and the like. In addition, when the CF substrate of the present invention is applied to the liquid crystal display device, the non-laminated part functions as a pixel region that transmits the colored light and/or a light-shielding region.

According to the laminated part, a part of the colored layer and/or the transparent layer comprises two or more laminated layers, and it is preferable that the colored layers having the different colors are laminated. For example, it is preferable that the colored layer of R, the colored layer of B and the transparent layer are laminated in this order, or the colored layer of R, the colored layer of G and the transparent layer are laminated in this order. According to the laminated part having the above constitution, since the sufficient light shielding effect can be provided, the display quality can be prevented from being lowered due to light leakage. Although the laminating manner which constitutes the laminated part is not particularly limited, it is preferable that the upper layer other than the uppermost layer is laminated so as to cover its lower layer. Although a dimension and a shape and the like of each layer constituting the laminated part is not particularly limited as long as the working effect of the present invention is provided, it is preferable that an area of the bottom layer is appropriately set in view of the film hardness (penetration characteristics) at the bonding temperature of the film to be laminated above. The pattern arrangement of the laminated part is not limited, and there are delta arrangement, the mosaic arrangement, the stripe arrangement and the like.

A description will be made in detail of another preferred embodiment common to the configurations (1) and (2) of the CF substrate of the present invention.

It is preferable that the CF substrate comprises a transparent electrode as a lower layer than an uppermost layer of the laminated part. According to the CF substrate having such constitution, since the conductive transparent electrode is not formed at the uppermost layer and the insulating resin film such as the colored layer or the transparent layer is formed in the uppermost layer, when it is applied to the liquid crystal display device, the laminated part can be appropriately used as the spacer.

The transparent electrode may be an indium tin oxide (ITO) film, which is formed by sputtering and the like. Although a dimension, a shape and the like of the transparent electrode is not particularly limited, it is preferable that it is formed so as to cover its base layer. Furthermore, in view of leak prevention between the electrodes, it is preferable that the layer formed on the transparent electrode in the laminated part is formed so as to cover the transparent electrode. In addition, as a pattern arrangement of the transparent electrode in the CF substrate, there are a stripe arrangement, a lattice arrangement and the like.

It is preferable that the CF substrate has a projection for controlling a liquid crystal alignment, and the laminated part includes a layer formed of a resin constituting the projection for controlling a liquid crystal alignment. Since the CF substrate having this constitution has the projection for controlling a liquid crystal alignment, it can be appropriately used as a CF substrate for liquid crystal display device of a multi-domain vertical alignment (referred to as the "MVA" hereinafter occasionally) type which implements a large viewing angle and a high contrast. In addition, since the laminated part comprises the layer formed of the resin which constitutes the projection for controlling a liquid crystal alignment, the projection for controlling a liquid crystal alignment and a part of the laminated part can be formed at the same time, so that the manufacturing steps can be simplified.

Although the above liquid crystal is not particularly limited, the liquid crystal preferably has negative dielectric anisotropy ($\Delta\epsilon<0$). In addition, the projection for controlling a liquid crystal alignment has a function of dividing the alignment of a liquid crystal molecule to a plurality of directions by distorting an electric field applied between the electrodes when a voltage is applied. The resin constituting the projection for controlling a liquid crystal alignment is preferably a photosensitive resin and more preferably it is a positive photosensitive resin, such as phenol-novolac positive resist. A dimension, a shape and the like of the projection for controlling a liquid crystal alignment is not particularly limited. The projection for controlling a liquid crystal alignment is preferably provided on the transparent electrode and more preferably on the transparent electrode on the non-laminated layer part.

It is preferable that an uppermost layer consists of a layer formed of a resin constituting an projection for controlling a liquid crystal alignment, and the layer other than the uppermost layer comprises the colored layer in the laminated part. According to the CF substrate having this constitution, the uppermost layer of the laminated part and the layer other than the uppermost layer of the laminated part can be formed at the step of forming the projection for controlling a liquid crystal alignment and at the step of forming the colored layer at the same time, respectively, so that the manufacturing steps of the CF substrate having the laminated part and the projection for controlling a liquid crystal alignment can be simplified.

The present invention also provides a method of manufacturing the above-mentioned CF substrate, wherein a non-laminated part in which a colored layer and/or a transparent layer are sequentially arranged in a plane, and a laminated part in which parts of the colored layer and/or the transparent layer are laminated as two or more layers is formed by repeatedly performing a step of bonding the dry film-comprising the solid-phase resist layer having substantially a constant thickness at temperature of not less than 110° C. to not more than 140° C. to transfer the solid-phase resist layer on the substrate, and a step of exposing and developing the solid-phase resist layer. Since the transferring step of the solid-phase resist layer is performed under a bonding condition at 110 to 140° C., the bubble can be prevented from being generated between the solid-phase resist layer and the pattern (or the substrate). In addition, a preferable lower limit of the bonding temperature of the dry film is 120° C. When the solid-phase resist layer is exposed and developed and the transferred solid-phase resist layer is patterned, the layer having the desired film thickness and shape can be formed in the predetermined position. Therefore, according to the manufacturing method of the CF substrate, various kinds of colored layers and transparent layers can be sequentially formed in the predetermined positions by repeating the transferring step and the exposing and developing step while the bubble are prevented from being mixed, and the laminated part and the non-laminated part can be formed at the same time.

The present invention further provides a liquid crystal display device comprising the above-mentioned CF substrate. Since the liquid crystal display device according to the present invention comprises the CF substrate according to the present invention which has the laminated part having a sufficient height and a small variation in height, the unevenness of the film thickness of the liquid crystal layer is reduced and a preferable display having no unevenness on a screen can be implemented. The liquid crystal display device according to the present invention can be appropriately used in a MVA type of large-size liquid crystal television (TV) and the like.

The present invention also provides a liquid crystal display device in which the above-mentioned CF substrate and an opposed substrate are arranged oppositely through a liquid crystal layer, at least a part of the laminated part in the CF substrate being in contact with the opposed substrate. According to the liquid crystal display device having this constitution, since at least one part of the laminated part is in contact with the opposed substrate, the laminated part can function as the cell gap adjusting spacer (laminated PS) to maintain the thickness of the liquid crystal layer (cell gap) constant. In addition, since the laminated part formed in the CF substrate of the present invention has a sufficient height and a small variation in height, the unevenness of the film thickness of the liquid crystal layer is reduced, so that a preferable display having no unevenness on the screed can be implemented.

At this time, a vertical alignment film such as a polyimide film may be arranged between the laminated part and the opposed substrate.

Although the opposed substrate is not limited as long as it is arranged so as to be opposed to the CF substrate through the liquid crystal layer, it is preferable that it is an active matrix substrate comprising an active element such as a thin film transistor (TFT) on the substrate. In addition, the liquid crystal molecule constituting the liquid crystal layer preferably has negative dielectric anisotropy ($\Delta\epsilon<0$).

Furthermore, the present invention provides a liquid crystal display device in which the above-mentioned CF substrate and the opposed substrate having a light-shielding region are arranged oppositely through a liquid crystal layer, the laminated part of the CF substrate overlapping with the light-shielding region of the opposed substrate. According to the liquid crystal display device having the above constitution, the laminated part can be arranged without lowering an aperture ratio (transmissivity) of the liquid crystal display device, so that the display characteristics is prevented from being lowered.

The light-shielding region is not particularly limited and it may be a region in which an storage capacitor wiring, TFT circuit layer or the like are formed.

According to the color filter substrate of the present invention, since the laminated part having the predetermined height and the stable height in which the variation in height on the substrate is reduced is provided, when this is used as the laminated layer photo spacer for adjusting the cell gap, there can be provided the liquid crystal display device in which the desired cell thickness is implemented and the display unevenness is reduced.

BEST MODE FOR CARRYING OUT THE INVENTION (Structure of Liquid Crystal Display Device)

Figure 3:
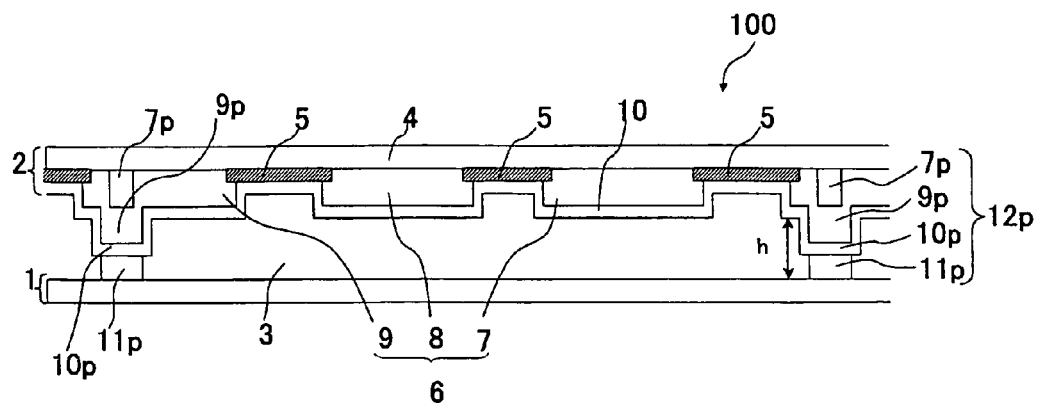
FIG. 3 is a schematic sectional view showing a constitution of a liquid crystal display device related to an embodiment of the present invention.

FIG. 3 is a sectional view schematically showing a constitution of a liquid crystal display device 100 related to an embodiment of the present invention. First, a constitution of the liquid crystal display device 100 according to this embodiment will be described with reference to FIG. 3. The liquid crystal display device 100 shown in FIG. 3 comprises an active-matrix (referred to as the AM hereinafter occasionally) substrate 1, a color filter (CF) substrate 2 opposed to the AM substrate 1, and a liquid crystal layer 3 provided between these substrates. Since a conventional known AM substrate of liquid crystal display device can be used as the AM substrate 1, a description of its constitution will be omitted here.

The CF substrate 2 comprises a transparent substrate 4, a light-shielding layer 5 (colored layer) and a CF layer (colored layer) 6 provided on the transparent substrate 4, a common electrode (transparent electrode) 10 provided so as to cover the light-shielding layer 5 and the CF layer 6, and an insulation resin film (transparent layer) lip provided on the common electrode 10. The light-shielding layer 5 is formed so as to have a lattice (or stripe) shape in a region other than pixels and called a black matrix (BM) also. In addition, the CF layer 6 comprises a first CF layer 7, a second CF layer 8 and a third CF layer 9 which transmit different color lights. The first CF layer 7, the second CF layer 8 and the third CF layer 9 are CF layers of red (R), green (G), and blue (B), respectively, for example. In addition, it is preferable that the first CF layer 7, the second CF layer 8 and the third CF layer 9 have substantially the same film thickness in view of display. In addition, the common electrode 10 is formed of a transparent conductive material (ITO, for example). Laminated PS (laminated part) 12p comprises a CF layer 7p formed at the same step as the first CF layer 7, a CF layer 9p formed on the CF layer 7p at the same step as the third CF layer 9, a common electrode 10p formed on the CF layer 9p at the same step as the common electrode 10, and an insulation resin film 11p formed on the common electrode 10p. At this time, a thickness of the liquid crystal layer (cell gap) is determined by a height "h" of the laminated PS 12p in the drawing.

(Manufacturing Method of CF Substrate)

FIGS. 4A to 4F are sectional views schematically showing a manufacturing flow of the CF substrate 2 in the liquid crystal display device 100 related to the embodiment of the present invention.

According to a manufacturing method of the CF substrate of the present invention, the CF layer 6 and each layer of the laminated PS 12p are formed by a dry film laminating (DFL) method. A dry film is constituted such that a photosensitive resin (solid-phase resist layer) whose penetration amount is 0.5 μm or less in a penetration hardness test at 120° C. is sandwiched by a film supporting body such as polyethylene terephthalate (PET) film. A pigment having a predetermined color (red, blue, green and black, for example) is diffused in the photosensitive resin. The photosensitive film used in the DFL method is preferably a negative resist film in general.

Figure 4A:
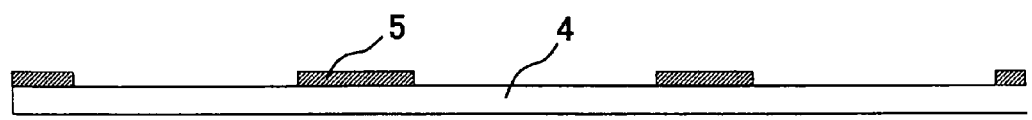
FIG. 4 are schematic sectional views showing a manufacturing method of a color filter substrate related to the embodiment of the present invention.

First, the light-shielding layer 5 is formed on the substrate 4 as shown in FIG. 4A. More specifically, a black dry film is pressed against the substrate 4 so as to be bonded thereto by a roller and then the film supporting body is removed, so that the black photosensitive resin film is transferred onto the substrate 4. This step is a step of transferring a resin film while the dry film is heated, that is, a thermal transfer step in general. Then, the black photosensitive resin film is exposed through a mask to be developed, whereby the light-shielding layer 5 is formed. Since the black photosensitive resin film is transferred onto the flat substrate 4, there is no bubble generated, so that it can be laminated at around 100° C. However, it is difficult to implement perfectly uniform temperature distribution in the substrate at the time of lamination and it is thought that a substrate temperature has a temperature range of ±10° C. from a set temperature in general. Therefore, it is preferable that the set temperature of the substrate when the black photosensitive resin film is transferred is 110 to 140° C. on an average.

At this time, when the set temperature of the substrate is set at a high temperature of 150° C. or more, a component in a resist film starts to polymerize partially, so that developing performance is lowered.

Figure 4B:
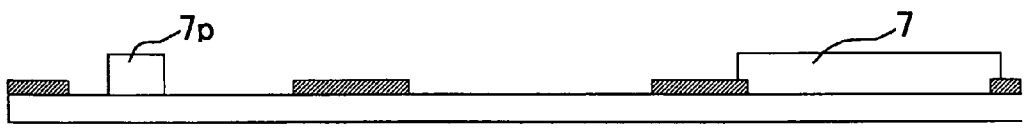

Then, the first CF layer 7 and the base layer (colored layer) 7p are formed at the same time as shown in FIG. 4B. More specifically, a dry film for the first CF layer 7 is pressed against the substrate 4 to be bonded thereto using the roller like in the method of forming the light-shielding layer 5 and then its film supporting body is removed, whereby the photosensitive resin film is transferred onto the substrate 4. Since the light-shielding layer 5 is already formed on the substrate 4 when the first CF layer 7 is bonded, a bubble is likely to be generated. However, if the substrate temperature is set at 110° C. or more, the CF layer pattern has no bubble. In this case also, it is difficult to implement perfectly uniform temperature distribution in the substrate at the time of lamination and it is thought that a substrate temperature has a temperature range of ±10° C. from a set temperature in general. Therefore, it is preferable that the set temperature of the substrate when the photosensitive resin film is transferred is 120 to 140° C. on an average. In addition, since the base layer 7p is directly bonded on the flat substrate 4, its height (film thickness) is not varied due to a difference in bonding temperature.

Then, the photosensitive resin film is exposed using a mask to be developed, whereby the first CF layer 7 and the base layer 7p are formed. At this time, it is preferable that the base layer 7p is formed in a position opposed to a part having a light shielding property (a part in which a metal wiring is provided, for example) on the AM substrate 1 when it is bonded to the AM substrate 1.

Figure 4C:
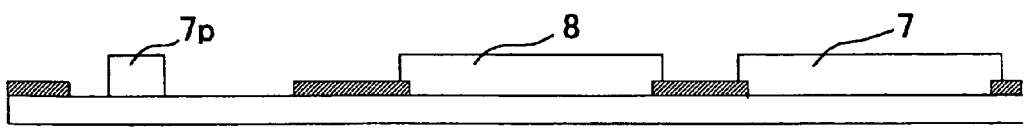

Then, the second CF layer 8 is formed as shown in FIG. 4C. The second CF layer 8 can be formed using a dry film for the second CF layer 8 by the same method as that of the first CF layer 7. It is preferable that a set temperature of the substrate when the photosensitive resin film is transferred is 120 to 140° C. on an average.

Figure 4D:
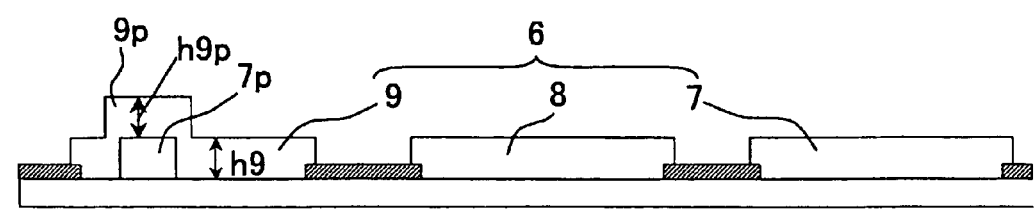

Then, the third CF layer 9 and the middle layer (colored layer) 9p are formed as shown in FIG. 4D. The third CF layer 9 can be formed using a dry film for the third CF layer 9 by the same method as that of the first CF layer 7. It is preferable that a set temperature of the substrate when the photosensitive resin film is transferred is 120 to 140° C. on an average. In addition, the middle layer 9p of the laminated PS 12p is preferably formed so as to cover the base layer 7p.

The CF substrate 2 according to the present invention is characterized in that a ratio of a thickness h9p of the middle layer 9p of the laminated PS to a thickness h9 of the third CF layer 9 (referred to as a "thickness ratio" hereinafter occasionally) is not less than 90% but not more than 110%. That is, it is characterized in that the following formula (1) is satisfied.

$$0.9 < h9p/h9 < 1.1 \tag{1}$$

Figure 4E:
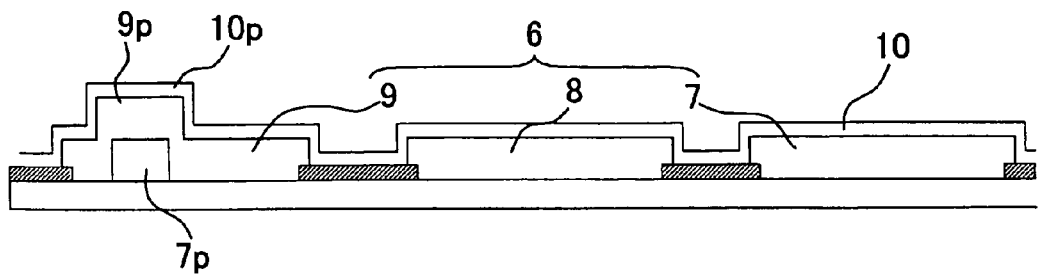

Then, the common electrode 10 (including 10p) is formed as shown in FIG. 4E. The common electrode 10 can be uniformly formed on the BM 5, the CF layer 6 (7, 8 and 9) and the middle layer 9p of the laminated PS by a method such as sputtering, using a transparent conductive material (ITO, for example).

Figure 4F:
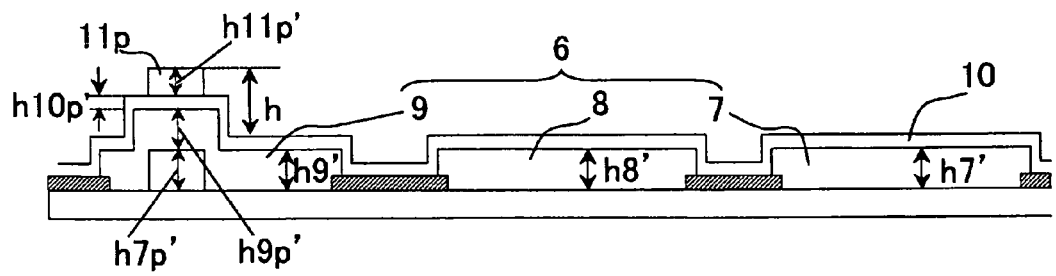

Then, the uppermost layer 11p is formed on the electrode 10p of the laminated PS 12p as shown in FIG. 4F, whereby the laminated PS 12p and the CF substrate 2 are completed. According to this embodiment, the solid-phase resist layer for the uppermost layer 11p of the laminated PS 12p also has a thickness ratio which is not less than 90% but not more than 110%. That is, the following formula (2) is satisfied.

$$0.9 < h11p/h11 < 1.1 \tag{2}$$

According to this embodiment, since there is no pattern formed of the same dry film as the uppermost layer 11p of the laminated part 12p, a pattern for confirmation (its height is h11) may be separately provided in a part of the substrate 4, for example in a flat part which is not used for display such as a glass surface or a frame of the BM 5, so that its thickness ratio h11p/h11 can be confirmed.

The photosensitive resin film used for the dry film of the uppermost layer 11p may be a positive type or a negative type. In either case, it is preferably bonded uniformly so as to prevent a bubble from being generated. If the bubble is generated, the film is deformed in the vicinity of the bubble and an outline of the bubble remains after the development as a residue, causing a display defect in some cases. It is thought that this is because the film is deformed in the vicinity of the bubble and the film becomes thick locally.

In addition, according to a dry film having a thermoplastic resin layer and a middle layer in which only a base film is removed from the substrate, when the positive photosensitive resin is used, it is found that nitrogen gas generated at the time of exposure cannot escape well and becomes a bubble, which causes a pattern defect (refer to Japanese Unexamined Patent Publication No. 2002-341525, for example). This phenomenon can be alleviated by setting the substrate temperature when the dry film is bonded at 120° C. or more to improve bonding force between the common electrode $10p$ and the resist layer. Therefore, similar to the case of the CF layer 6, the set temperature of the substrate when the photosensitive resin film is transferred is preferably 120 to 140° C. on an average.

Figure 5:
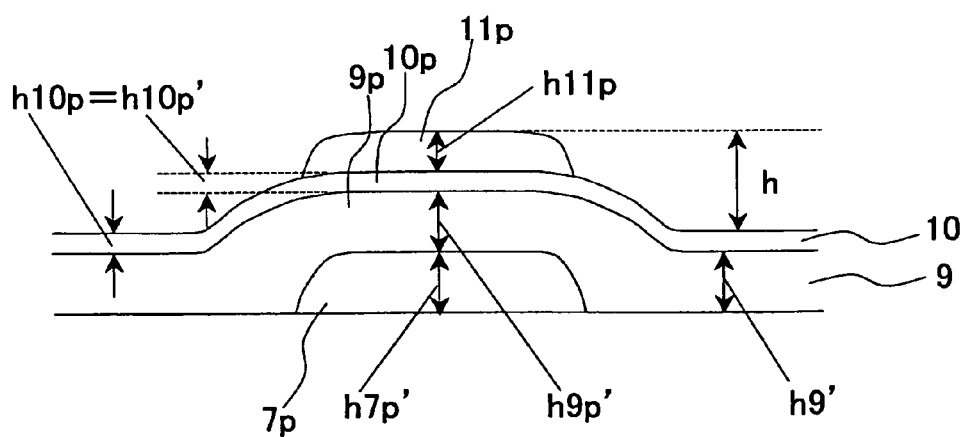
FIG. 5 is a schematic sectional view showing an essential configuration of a laminated part in the color filter substrate related to the embodiment of the present invention.

As shown in FIG. 4F, the CF substrate 2 formed as described above comprises the laminated PS $12p$ having a height "h" and a film thickness of each layer satisfies each of the following formulas (3), (4) and (5). In addition, a dash (') allotted to the right shoulder of the reference character in FIG. 4F means that an extremely small part of the resin component is vaporized and the film is slightly reduced in thickness because of ITO sputtering or a heat history such as baking of $11p$ performed during the process, and the same is applied to the following formulas (3), (4) and (5). At this time, the laminated PS $12p$ and a normal pixel part are reduced in thickness at the same ratio. In addition, although h11' in the following formula (5) is not shown in FIG. 4F, it designates a film thickness of a layer formed on the substrate 4 and the like at the same step as that of the uppermost layer lip of the laminated PS after it is reduced in thickness. In addition, FIG. 5 is a schematic sectional view showing an essential configuration of the laminated part $12p$.

$$h9' \cong h8' \cong h7' \tag{3}$$

$$0.9 \leq h9p'/h9' \leq 1.1 \tag{4}$$

$$0.9 \leq h11p'/h11' < 1.1 \tag{5}$$

According to the CF substrate in this embodiment, the thickness ratios of the base layer $7p$, the middle layer $9p$ and the uppermost layer lip of the laminated part $12p$ implement 90 to 110%, and a variation in height of the laminated PS caused by a variation in temperature or a variation in pressure on the substrate when the dry film is bonded can be effectively reduced. According to a preferable configuration in this embodiment, each of the base layer $7p$, the middle layer $9p$ and the uppermost layer lip of the layers PS $12p$ is formed using a dry film having a photosensitive resin film whose penetration amount in the penetration hardness test at 120° C. is 0.5 μm or less and difference between a maximum penetration amount and a minimum penetration amount in the penetration hardness test at 110 to 140° C. is 1.0 μm or less. When the layers are formed using the above dry films, the thickness ratios of 90 to 110% of the base layer $7p$, the middle layer $9p$ and the uppermost layer $11p$ of the laminated part $12p$ can be easily implemented and a working effect of the present invention can be easily provided.

The present invention is not limited to the above CF substrate and there is another embodiment in which a projection for controlling a liquid crystal alignment is formed on the common electrode 10, for example. According to a CF substrate in this embodiment, an uppermost layer $11p$ is preferably formed at a step when the projection for controlling a liquid crystal alignment is formed in view of simplification of manufacturing steps.

(Manufacturing Method of Liquid Crystal Display Device)

As shown in FIG. 3, the CF substrate 2 provided as described above and the AM substrate 1 prepared separately are bonded through a seal material (not shown) applied to the outside of the display region of one substrate. At this time, an alignment film (not shown) is previously formed on the surfaces of the CF substrate 2 and the AM substrate 1. Then, the liquid crystal material 3 is injected into a gap between both substrates and sealed therein, whereby the liquid crystal display device 100 is completed. In addition, both substrates maybe bonded after the liquid crystal layer 3 is formed on the substrate to which the seal material is applied by a falling-drop method. Since the liquid crystal display device manufactured as described above comprises the CF substrate having the laminated PS in which there is no bubble or unevenness or development residue generated when the dry film is bonded, the height is stable, display unevenness caused by cell thickness unevenness can be prevented.

Although the working examples will be described in detail with reference to the drawings hereinafter, the present invention is not limited to only the following examples.

WORKING EXAMPLES 1 AND 5 AND
COMPARATIVE EXAMPLES 1 AND 2

(Structure of Dry Film)

Figure 8:
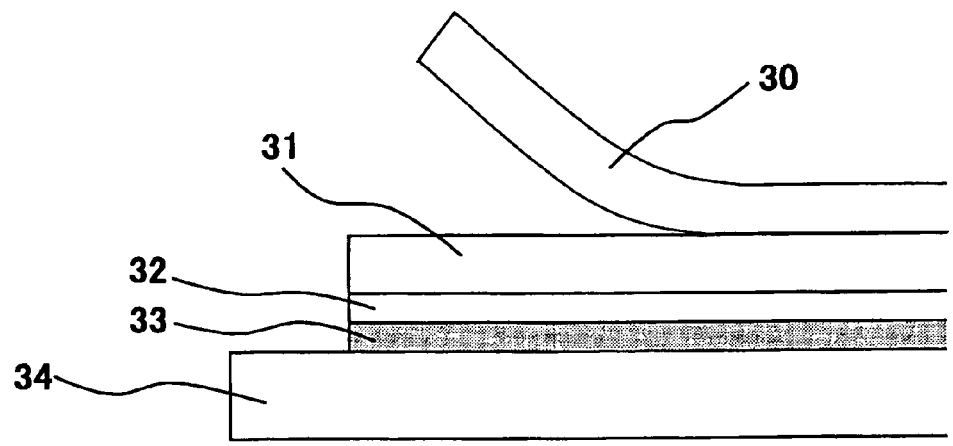
FIG. 8 is a view to explain a used state of the dry film (DF) used in the working examples 1 to 5 and the comparative examples 1 and 2.

First, a film constitution and a separated part of the dry film (DF) used in the working examples 1 to 5 and comparative examples 1 and 2 will be described with reference to FIG. 8.

The dry film used in the working examples 1 to 5 and comparative examples 1 and 2 has a structure in which a base film 30, a thermoplastic resin layer 31 to improve bonding force, a middle layer 32 and a solid-phase resist layer 33 are laminated. According to a method of bonding the solid-phase resist layer 33 to a substrate 34 with the use of the dry film, the dry film is bonded to the substrate 34 and then the film is separated at an interface between the base film 30 and the thermoplastic resin layer 31. Although the solid-phase resist layer 33 is exposed through the thermoplastic resin layer 31 and the middle layer 32, since both thermoplastic resin layer 31 and the middle layer 32 are transparent, the solid-phase resist layer 33 is not prevented from being exposed. In addition, since the thermoplastic resin layer 31 and the middle layer 32 have no photosensitivity, they are completely removed at the developing step regardless of the exposure.

(Penetration Hardness Test of Dry Film)

A description will be made of film hardness of the dry film (DF) used in the working examples (WE) 1 to 5 and the comparative examples (CE) 1 and 2.

Figure 6:
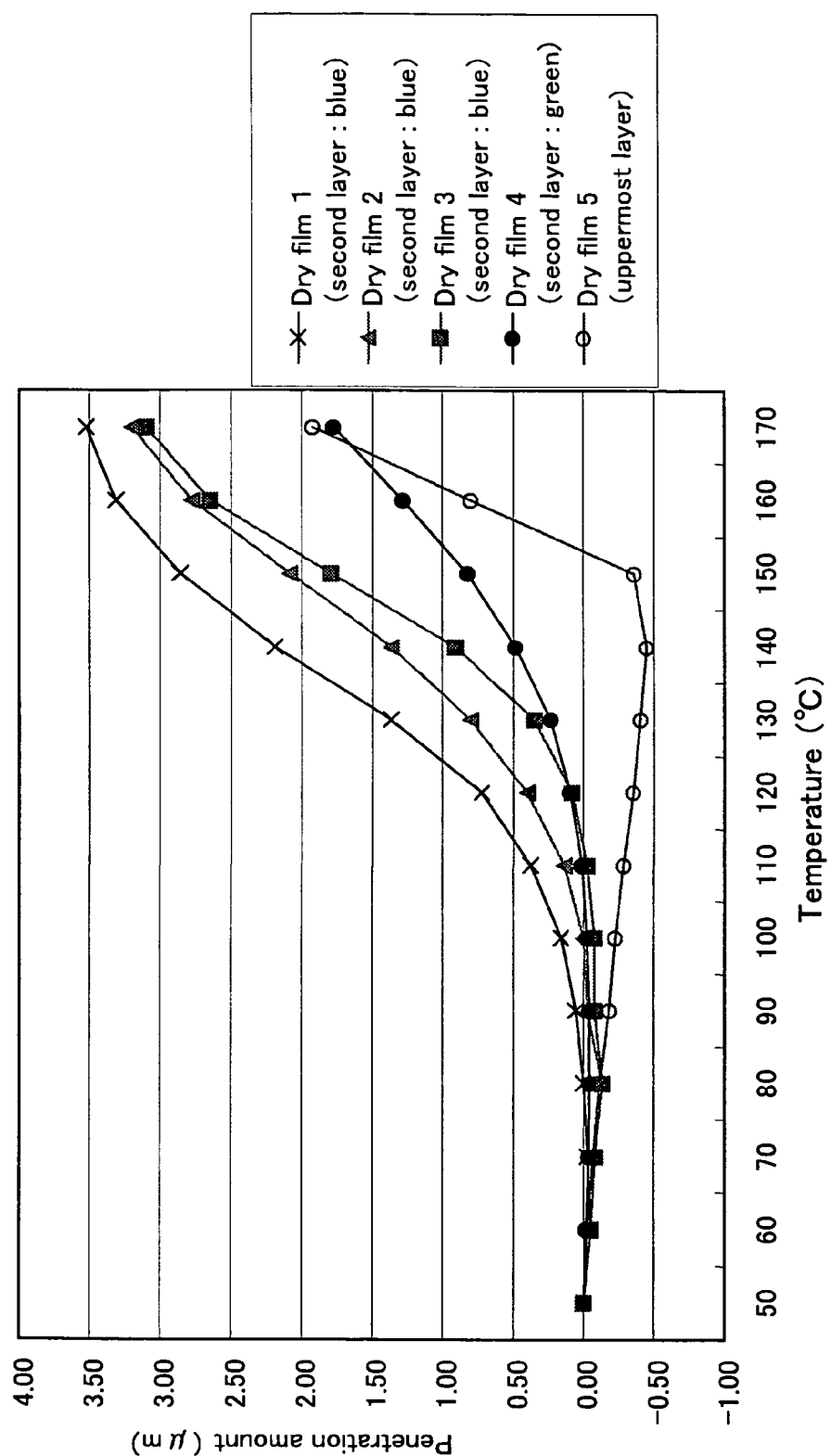
FIG. 6 is a view showing penetration characteristics of a solid-phase resist layer of each dry film (DF) used in working examples 1 to 5 and comparative examples 1 and 2.
Figure 7A:
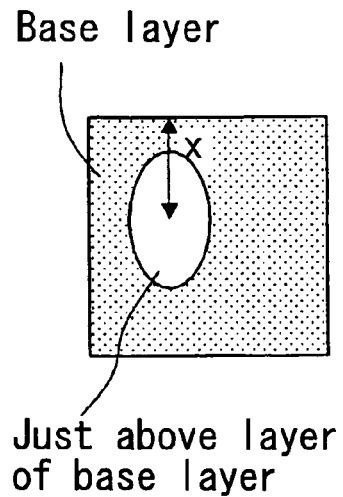
FIGS. 7A to 7D are views to explain a definition of a size of a base layer.
Figure 7B:
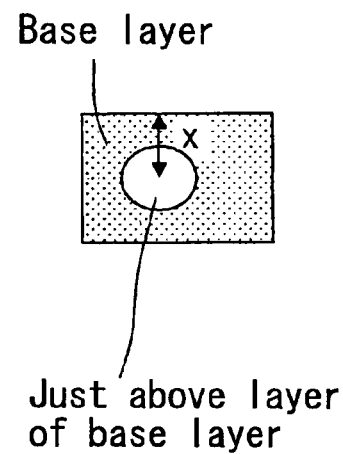
Figure 7C:
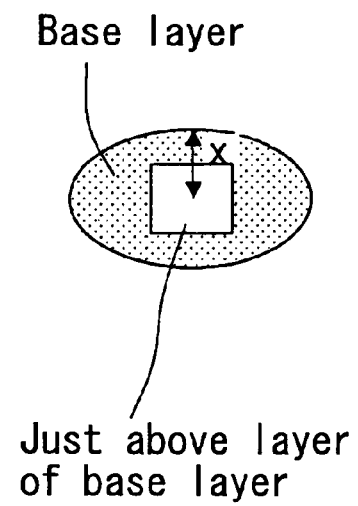
Figure 7D:
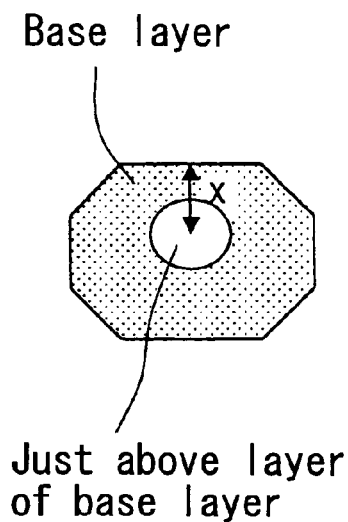

FIG. 2 is a schematic view showing a tip end of a thermal probe 35 provided by bending a platinum-rhodium resistor body having a diameter of 3.3 μm into a V shape so as to implement that a tip end angle is 120° and a tip end curvature R is 2.5 μm, which is used in measuring the film hardness of the solid-phase resist layer of the dry film (DF). FIG. 6 shows temperature characteristics of the film hardness of the solid-phase resist layer of the dry film used in the working examples 1 to 5 and the comparative examples 1 and 2. More specifically, the thermal prove 35 is pressed under load $1.0 \times 10^{-5}$ N and a penetration amount of the thermal probe 35 into the solid-phase resist layer is plotted at each temperature. Referring to FIG. 6, each of dry films 1 to 3 has a blue negative type resist layer and a dry film 4 has a green negative type resist layer. In addition, a dry film 5 has a positive type transparent resist layer positioned as the uppermost layer (on ITO) of the laminated PS.

A penetration amount at 120° C. and a difference between a maximum penetration amount (max.PA) and a minimum penetration amount (min.PA) at 110 to 140° C. in each resist layer are shown in a table 1.

TABLE 1

|  | Penetration amount at 120° C.(μm) | (max. PA) − (min. PA) at 110 to 140° C.(μm) | Example of use | Resist color |
|---|---|---|---|---|
| DF1 | 0.72 | 1.81 | WE4, CE1, 2 | Blue |
| DF2 | 0.40 | 1.23 | WE1 | Blue |
| DF3 | 0.08 | 0.93 | WE2 | Blue |
| DF4 | 0.09 | 0.47 | WE3, 5 | Green |
| DF5 | −0.36 | 0.17 | WE1~5, CE1, 2 | Transparent |

As shown in the table 1, the penetration amount of the dry film 1 at 120° C. was more than 0.5 μm and the difference between the maximum penetration amount and the minimum penetration amount at 110 to 140° C. was as great as 1.81 μm. In addition, although the penetration amount of the dry film 2 at 120° C. was not more than 0.5 μm, the difference between the maximum penetration amount and the minimum penetration amount at 110 to 140° C. was 1.23 μm, which was more than 1.0 μm. In addition, the penetration amounts of the dry films 3, 4 and 5 at 120° C. were not more than 0.5 μm and the differences between the maximum penetration amounts and the minimum penetration amounts at 110 to 140° C. were not more than 1.0 μm.

(Study of Bonding Temperature of Dry Film)

Then, regarding each of the above dry films (DF) 1 to 5, a relation of a set temperature of the substrate at the time of laminating and generation of a lamination bubble and a development residue was studied. Its result is shown in a table 2. In addition, a dry coater produced by Hitachi Techno Service Co., Ltd. is used as a laminating apparatus.

Meanwhile, according to the dry film 5, the lamination bubble was not generated when the set temperature of the substrate was at 110° C., but a pattern defect caused by the exposure bubble such as nitrogen gas was generated when the temperature was less than 120° C.

(Manufacturing of Laminated Photo Spacer and Evaluation Test of Display Unevenness)

Three-layer laminated PS was formed in the following working examples 1 to 5 and the comparative examples 1 and 2, using the dry films having the above characteristics. A table 3 shows a constitution of the three-layer PS formed in the working examples (WE) 1 to 5 and the comparative examples (CE) 1 and 2, a thickness ratio of each layer, a height of the laminated PS, and a generation status of unevenness of a liquid crystal display device comprising the laminated PS. In the table 3, "DF0" designates a dry film used in forming a bottom layer of the laminated PS. A dot size designates an area of the bottom layer of the laminated PS. As shown in FIG. 7A to 7D, assuming that a shortest distance from an outer edge of the bottom layer (base layer) to the center of gravity of its just above layer is X (μm) when viewed from the normal line direction to the substrate surface, the size of the bottom layer (base layer) is designated by 2X μmφ. In addition, in the case of laminated part which comprises two or more layers, a region in which the number of laminated layers is the greatest is regarded as the region of the bottom layer (base layer), and assuming that the shortest distance from an outer edge of the region to the center of gravity of its just above layer is X (μm), a size of the bottom layer (base layer) is designated by 2X μmφ. From the result of the table 2, the dry film was laminated at the substrate temperature 120° C. in the process of forming the laminated PS in the working examples 1 to 5 and the comparative examples 1 and 2. In addition, according to measurement of a substrate temperature distribution of a pattern formed region in the laminating apparatus used in the

TABLE 2

|  | Bubble generation | No bubble nor residue | Residue generation | Bonding order | Laminated order | Exposure bubble |
|---|---|---|---|---|---|---|
| DF1 | 110° C. | 120~140° C. | 150° C. | Third | Second layer | |
| DF2 | 110° C. | 120~140° C. | 150° C. | Third | Second layer | |
| DF3 | 110° C. | 120~140° C. | 150° C. | Third | Second layer | |
| DF4 | 110° C. | 120~140° C. | 150° C. | Second | Second layer | |
| DF5 | 100° C. | 110~140° C. | 150° C. | On ITO (last) | Uppermost layer | good at 120° C. or more |

As shown in the table 2, generation of the lamination bubble could not be prevented when the set temperature of the substrate was less than 120° C. regarding the dry films 1 to 4.

working examples 1 to 5 and the comparative examples 1 and 2, a temperature range was ±10° C. with respect to the set temperature.

TABLE 3

|  |  |  | WE1 | WE2 | WE3 | WE4 | WE5 | CE1 | CE2 |
|---|---|---|---|---|---|---|---|---|---|
| Kind of film | First layer | Red resist | DF0 | DF0 | DF0 | DF0 | DF0 | DF0 | DF0 |
|  | Second layer | Blue or green resist | DF2 | DF3 | DF4 | DF1 | DF4 | DF1 | DF1 |
|  | Third layer | Transparent resist (positive) | DF5 | DF5 | DF5 | DF5 | DF5 | DF5 | DF5 |
| CF substrate | First layer | Dot size(μmφ) | 22.0 | 22.7 | 22.5 | 29.5 | 25.0 | 23.5 | 25.0 |
|  |  | Film thickness of laminated part h7p' (μm) | 2.03 | 2.02 | 2.01 | 1.97 | 2.01 | 2.01 | 1.96 |

TABLE 3-continued

|  |  |  | WE1 | WE2 | WE3 | WE4 | WE5 | CE1 | CE2 |
|---|---|---|---|---|---|---|---|---|---|
|  | Second layer | Film thickness of pixel part h9' (μm) | 2.07 | 2.06 | 2.04 | 2.04 | 2.03 | 2.07 | 2.05 |
|  |  | Film thickness of laminated PS part h9p' (μm) | 1.87 | 2.06 | 2.09 | 2.08 | 2.21 | 1.39 | 1.71 |
|  |  | Thickness ratio of the laminated PS part h9p'/h9' | 90% | 100% | 102% | 102% | 109% | 67% | 83% |
|  | Third layer | Film thickness of flat part h11 (μm) | 1.54 | 1.53 | 1.54 | 1.52 | 1.52 | 1.53 | 1.53 |
|  |  | Film thickness of laminated PS part h11p(μm) | 1.50 | 1.51 | 1.51 | 1.49 | 1.51 | 1.50 | 1.53 |
|  |  | Thickness ratio of the laminated PS part h11p/h11 | 97% | 99% | 98% | 98% | 99% | 98% | 100% |
|  | Height of laminated PS h(μm) |  | 3.37 | 3.57 | 3.60 | 3.57 | 3.72 | 2.89 | 3.24 |
| Display device | Evalution of display unevenness |  | good | excellent | excellent | good | excellent | poor | fair |

According to the laminated PS in the comparative examples 1 and 2 using the dry film 1 as the second layer, the thickness ratios of the second laminated layer were as low as 67% and 83%. In addition, according to the laminated PS in the comparative examples 1 and 2, the height of the laminated PS was as low as 2.89 μm and 3.24 μm (compared to the target value: 3.5±0.2 μm) and cell thickness unevenness caused by the variation in height of the laminated PS in the liquid crystal display device was clearly visible at a level which became a problem as display unevenness in practice.

Meanwhile, according to the laminated PS in the working example 4 using the dry film 1 as the second layer, since the dot size was increased, the thickness ratio of the second layer of the laminated PS was as high as 102%, so that the cell thickness unevenness caused by the variation in height of the laminated PS in the liquid crystal display device did not reach a level which became a problem in practice.

In addition, according to the laminated PS in the working examples 1 to 5, in which the thickness ratios of all of the layers of the laminated PS were not less than 90% and not more than 110%, the cell thickness unevenness caused by the variation in height of the laminated PS in the liquid crystal display device did not reach the level which became the problem in practice. In addition, according to the laminated PS in the working examples 2, 3 and 5 in which the thickness ratios of the second and third layers were not less than 98%, the display unevenness caused by the variation in height of the laminated PS in the liquid crystal display device was almost invisible and extremely preferable display quality was provided.

As described above, when the thickness ratio of each layer in the laminated PS is made to be not less than 90% and not more than 110%, there was provided the liquid crystal display device of high quality having no practical problem.

What is claimed is:

1. A liquid crystal display device comprising a color filter substrate and an opposed substrate, the color filter substrate and the opposed substrate being arranged oppositely through a liquid crystal layer, wherein
   the color filter substrate includes:
   a non-laminated part in which a colored layer and/or a transparent layer are arranged in a plane;
   a laminated part in which a colored layer and a transparent layer are laminated as two or more layers on a substrate; and
   a projection for controlling a liquid crystal alignment, the projection aligning liquid crystals in a plurality of different directions, the projection being arranged on the non-laminated part,
   the laminated part includes an uppermost layer formed of a resin constituting the projection for controlling a liquid crystal alignment,
   a film thickness of each layer constituting the laminated part is not less than 90% and not more than 110% to a film thickness of a corresponding layer of the non-laminated part, and
   at least a part of the uppermost layer is in contact with the opposed substrate.

2. The liquid crystal display device according to claim 1, wherein the color filter substrate comprises a transparent electrode as a lower layer than an uppermost layer of the laminated part.

3. The liquid crystal display device according to claim 1, wherein an uppermost layer consists of a layer formed of a resin constituting an projection for controlling a liquid crystal alignment and a layer other than the uppermost layer comprises a colored layer in the laminated part.

4. A method of manufacturing the color filter substrate according to claim 1, wherein
   a non-laminated part in which a colored layer and/or a transparent layer are sequentially arranged in a plane, and
   a laminated part in which parts of the colored layer and/or the transparent layer are laminated as two or more layers is formed by repeatedly performing a step of bonding a dry film comprising a solid-phase resist layer having substantially a constant thickness at temperature of not less than 110° C. to not more than 140° C. to transfer the solid-phase resist layer on the substrate, and a step of exposing and developing the solid-phase resist layer.

5. A liquid crystal display device according to claim 1 wherein the opposed substrate has a light-shielding region, and
   the laminated part of the color filter substrate overlapping with the light-shielding region of the opposed substrate.

* * * * *

UNITED STATES PATENT AND TRADEMARK OFFICE
CERTIFICATE OF CORRECTION

PATENT NO. : 7,586,563 B2  Page 1 of 1
APPLICATION NO. : 11/183734
DATED : September 8, 2009
INVENTOR(S) : Tokuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Fourteenth Day of September, 2010

David J. Kappos
*Director of the United States Patent and Trademark Office*